Oct. 11, 1960  G. NIEDERST  2,955,725
GASOLINE METERING AND VENDING DEVICE
Filed Dec. 5, 1955  2 Sheets-Sheet 1

INVENTOR.
GEORGE NIEDERST
BY
Harry H. Hitzeman
ATTORNEY.

Oct. 11, 1960  G. NIEDERST  2,955,725
GASOLINE METERING AND VENDING DEVICE
Filed Dec. 5, 1955  2 Sheets-Sheet 2
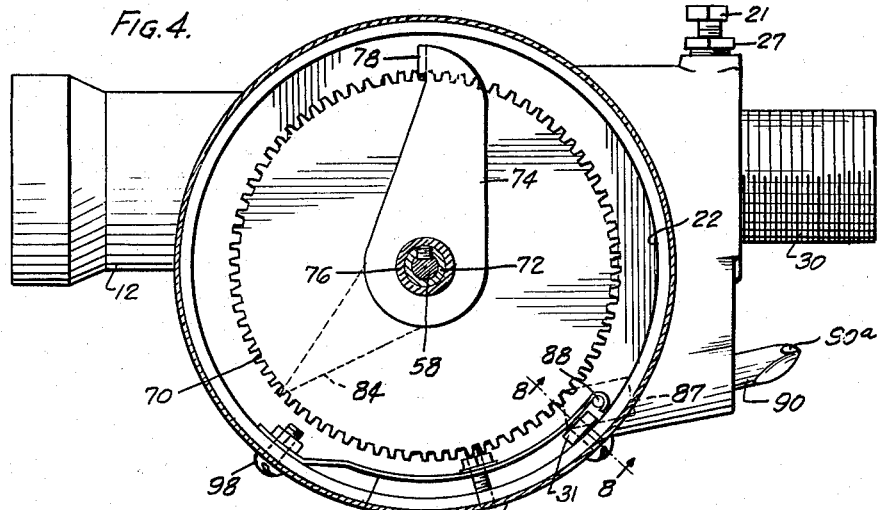
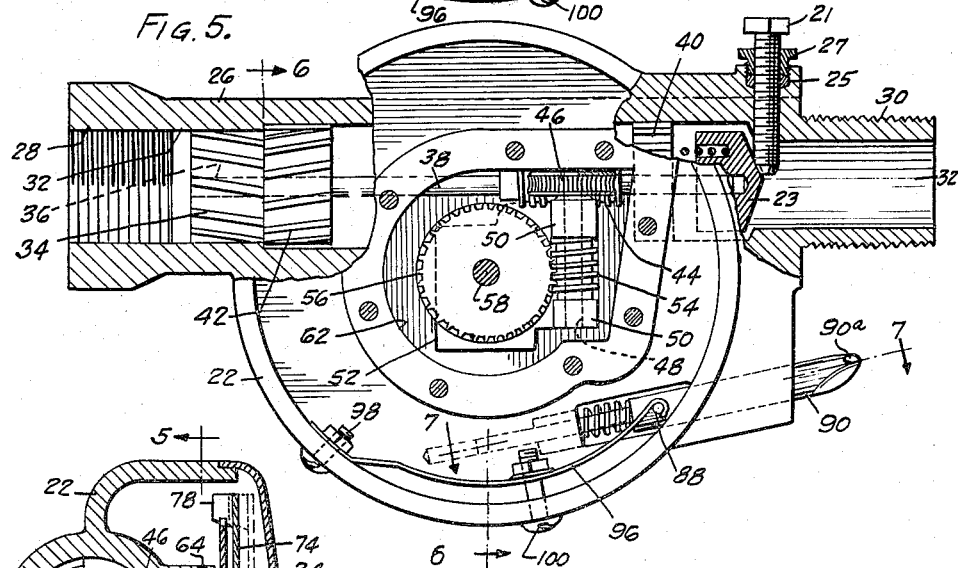
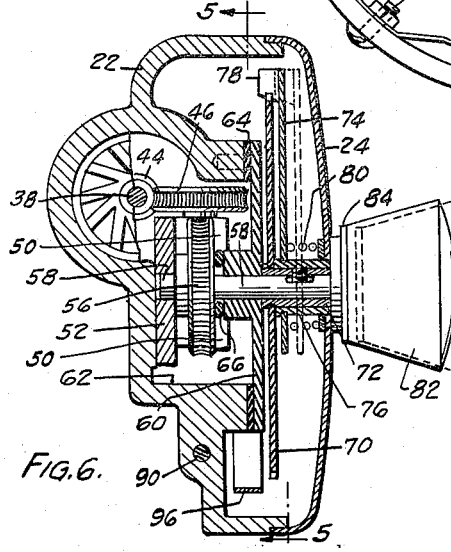
INVENTOR.
GEORGE NIEDERST
BY
Harry H. Hitzeman
ATTORNEY.

United States Patent Office 2,955,725
Patented Oct. 11, 1960

2,955,725

GASOLINE METERING AND VENDING DEVICE

George Niederst, Chicago, Ill., assignor, by mesne assignments, to Femar Corporation, Chicago, Ill., a corporation of Illinois Filed Dec. 5, 1955, Ser. No. 551,041

2 Claims. (Cl. 222—17)

My invention relates to liquid measuring and dispensing devices.

My invention relates more particularly to a device of the type described for use in metering and vending gasoline and similar products.

The principal object of the present invention is to provide a metering device capable of attachment to the filling nozzle of a gasoline pump, the metering device being located between the filling nozzle and the hose which extends from the gasoline pump.

A further object of the invention is to provide a metering device of the type described which may be provided with a dial and a manually movable indicator so that a customer may order a specific amount of gasoline, the indicator may be set at the amount ordered, and the filling nozzle will be automatically shut off when this amount of gasoline has passed through the metering device and nozzle.

A further object of the invention is to provide a metering device of the type described which is adaptable for use either with the manually operated filling nozzles or with the filling nozzles which automatically shut off when the tank of the automobile has been filled.

A further object of the invention is to provide a metering device of the type described that is completely automatic in operation and one that will stand long and hard usage without becoming broken or out of order.

Other objects and advantages will be more apparent from the following description wherein reference is had to the accompanying drawings, upon which:

Fig. 4 is a side elevational view of the metering device per se, with a portion of the housing shown in section generally on the lines 4—4 of Fig. 2;

Fig. 5 is a cross-sectional view of the metering device taken generally on the line 5—5 of Fig. 6;

Fig. 6 is a transverse sectional view taken on the line 6—6 of Fig. 5;

Fig. 7 is a fragmentary sectional view on the line 7—7 of Fig. 5, showing the manually operable shut-off.

Figure 1:
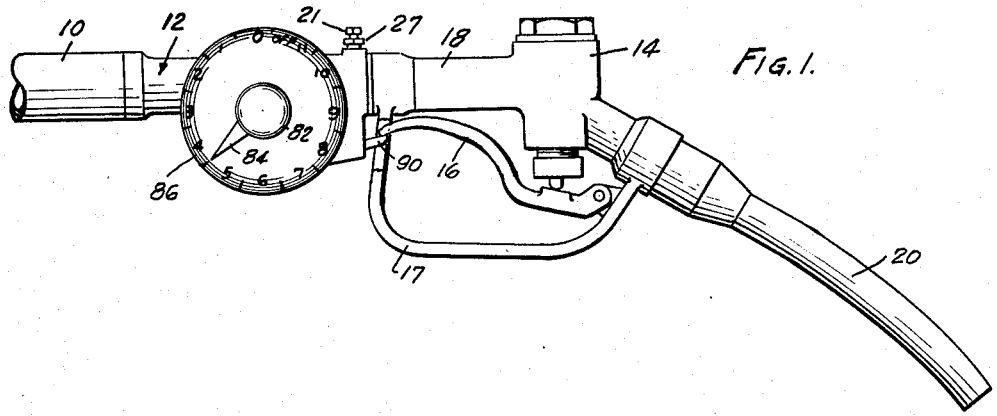
Fig. 1 is a side elevational view showing a portion of the filling hose, the metering device and the nozzle.
Figure 2:
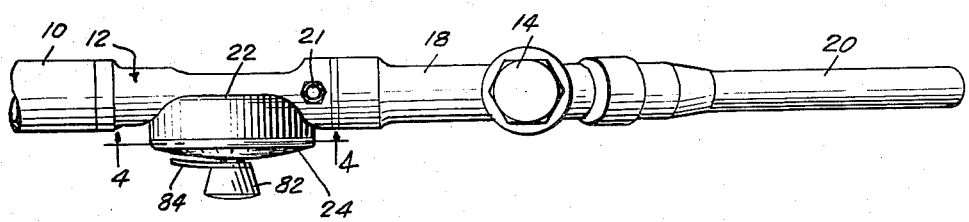
Fig. 2 is a plan view thereof.
Figure 3:
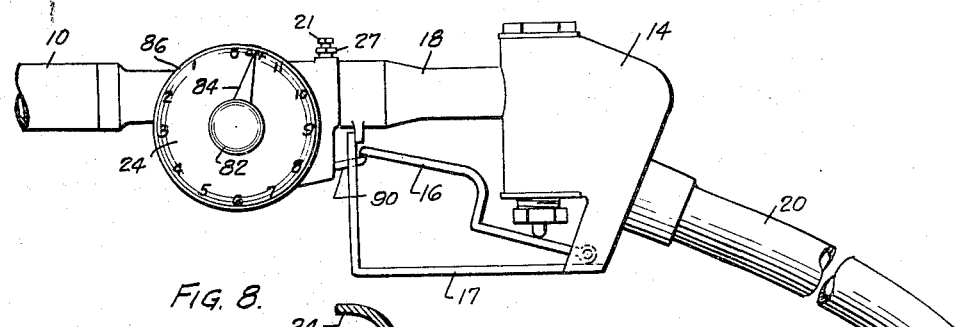
Fig. 3 is a side elevation similar to Fig. 1 of the metering device shown in association with an automatic shut-off type of nozzle.

In the embodiment of the invention which I have chosen to illustrate and describe the same, in Fig. 1 I have shown the usual filling hose 10 which extends from the gasoline pump, the metering device 12 positioned between the same and the filling nozzle 14. The filling nozzle 14 may be of the usual type which is equipped with a valve that is manually opened by means of a trigger 16, the trigger being operated by the fingers of the hand grasping the trigger and the valve housing 18 of the nozzle 14. This permits fluid under pressure to be directed through the hose 12 and nozzle 14 out of the filling spout 20, as is familiar to those skilled in the art.

The metering device 12 may have a housing 22 generally cylindrical in shape and provided with a cover 24. The housing also has a tubular portion 26 which extends transversely across the upper portion of the same, one end of the tubular portion being provided with an internal thread 28 for connection to the hose 10 and the other end being provided with an externally threaded portion 30 for connection to the nozzle 14.

The tubular member 26 may be provided with an internal bore or chamber 32 throughout its length, and in the forward portion of the same adjacent the connection to the hose 10, I provide stationary vanes 34 which have a hub provided with a bore 36 for the shaft 38. A similar stationary vane 40 located adjacent the outlet end of the bore 32 provides a bearing for the opposite end of the shaft 38.

A rotor 42 is fixedly secured to the shaft 38 and is located adjacent the stator or stationary vane 34, and as gasoline or other liquid is pumped through the bore 32, the rotor 42 is rotated. A worm wheel 44 is fixedly secured to the shaft 38 and serves to drive a worm wheel 46 geared thereto. The worm wheel 46 is mounted on a shaft 48 journalled in suitable bearings 50 on a block 52 that is fastened to the end wall of the housing 22.

A worm gear 54 is mounted on the shaft 48 and serves to drive a worm wheel 56 which is mounted upon a shaft 58. One end of the shaft 58 is mounted in a bore in the base plate 52 and the other end extends through a cover plate 60 on the chamber 62 that is formed in the housing 22. A suitable gasket 64 is placed beneath the cover 60 to provide a fluid-tight seal, and in addition an O-ring gasket 66 is provided between the hub of the cover and the worm wheel 56 to provide leakage out of the housing of the meter. An enlarged face gear 70 is mounted on the shaft 58 by means of a hub 72 beneath the cover plate 24 of the housing 22.

In normal operation the face gear 70 will rotate with the shaft 58, the drive therefor coming from the force of flow of liquid through the bore 32, thus causing the vanes 42 to rotate as the liquid flows through, driving shaft 38, and through the worms and worm wheels hereinbefore mentioned, the shaft 58. The gear 70 is the metering gear whose teeth are so spaced that each one represents one quart of fluid.

I provide an arm 74 provided with a collar 76 that is mounted for rotation on the hub 72 of the gear 70. The arm 74 has an inwardly turned finger 78 at its end, the finger being turned transversely thereto to engage between the teeth of the metering gear 70. The finger is normally held in engagement with the teeth by means of a coiled spring 80 positioned between the arm 74 and the cover 24 of the housing 22.

The collar 76 extends through an opening in the cover 24 and is provided at its end with a knob 82 which has a pointer 84 connected to the same. The cover 24 of the housing 22 is provided with a circular dial 86 which has numbers from zero to 11 thereon, the numbers representing gallons of fluid, and in use the knob may be withdrawn, thereby disengaging the finger 78 from the teeth of the metering gear 70, and the knob may be rotated to designate the amount of fluid to be metered.

In operation, when the indicator is set at for example 4½ gallons, and the trigger 16 of the nozzle is compressed to permit the flow of fluid through the nozzle 10, the rotor 42 will be revolved as the fluid flows through and will, through the worm and gear train, rotate shaft 58, in turn rotating the metering gear 70 through the arm 74 and finger 78.

As shown in dot-dash lines in Fig. 4, the relation between the indicator 84 and the arm 74 is such that as the arm 74 rotates clockwise through the distance to bring the indicator from indicating 4½ gallons to zero, the finger 78 will travel clockwise and engage the pin 88. The pin 88 is connected to a latch rod 90 which is slidably mounted in a chamber 92 in the housing 22, and is normally pressed outwardly in the chamber 92 by means of a compression spring 94.

The latch 90, as best shown in Fig. 1, extends through the trigger guard 17 of the nozzle 80 so that when the trigger is grasped to open the valve in the nozzle 80, it will move past the latch 90 and be held in open position until the latch 90 is withdrawn. This occurs when the finger 78 travels around to engage the pin 88, moving it to the left from the position shown in Fig. 5, thus withdrawing the latch 90 and permitting the trigger of the nozzle to swing downwardly, closing off the valve in the nozzle and thereby stopping the flow of fluid. In this movement, the latch 90, due to the outward movement of the spring 96, is slightly rotated, permitting the end of the trigger 16 to fall off the flattened edge 90a on the end of the latch 90.

The pin 88 is normally held in upright position by the flat spring 96 which is fastened in the housing 22 by a bolt and nut member 98 at its end, and held in position for back and forth flexing on a second bolt member 100. The bolt member 100 is also used to adjust the position of latch 90; by drawing flat spring 96 outwardly it engages pin 88 and moves the latch 90.

If at any time during the operation of the metering device it is desired to shut off the nozzle valve, this may be done by pressing the thumb member 87 to the right, the thumb member being connected by a pin 89 to the latch rod 90, the pin 89 extending through an elongated opening 91 in the housing 22.

To properly adjust the flow of fluid through the chamber 32, I provide an adjusting screw 21 which has an end that abuts a spring-pressed valve 23 at the forward end of the tubular member 26. To insure against leakage at the adjusting screw 21, I provide a suitable packing gland 25 and follower 27.

Figure 8:
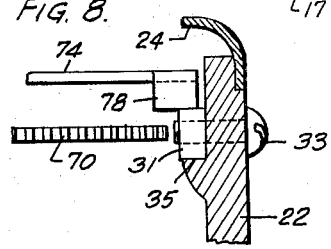
Fig. 8 is a fragmentary section on the line 8—8 of Fig. 4 showing the metering device in non-operating position.

When it is desired to place the metering device in non-operating position, as for example when it is being used with a filling nozzle with automatic shut-off of the type shown in A. H. Davis, Jr. Patent No. 2,320,033, I have provided a platform in the nature of a square nut 31 which may be mounted upon a screw 33 fastened through the wall of the housing 22, see Fig. 8. The square nut may be held against movement upon a shoulder 35 formed integral with the housing, and is adapted to receive the finger 78 of the arm 74 to hold the same out of engagement with the teeth of the metering gear 70.

From the above and foregoing description it can be seen that I have provided a measuring or metering device for adaptation with either the standard filling nozzle of gasoline pumps or the filling nozzle with an automatic shut-off. In either case the metering device may be connected directly between the hose from the fluid pump to the nozzle, and in connection with nozzles with automatic shut-offs, the same can be used either for metering fluid up to a specific number of gallons, or it can be placed in non-operating position and the flow may continue until the automatic shut-off operates.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. A metering device for connection between a fluid control nozzle having a valve operable to open position by a spring-charged trigger and a supply conduit to said nozzle, said device comprising a housing mounted between said supply conduit and the back of said nozzle, said housing having a tubular member formed integral therewith and extending transversely of said housing and having one end connected to said supply conduit and the other to said nozzle, said tubular member having a chamber therein, a longitudinal shaft mounted in said chamber, a rotor fastened to said shaft, a worm gear fastened to said shaft, a second shaft transversely mounted in said housing, a worm wheel fastened to said second shaft in driving engagement with said worm, a stub shaft in said housing, a worm drive between said second shaft and said stub shaft, a face gear fastened to said stub shaft, an arm rotatably mounted on said stub shaft alongside of said face gear, said arm having an offset shoulder yieldingly engaging a desired tooth of said face gear, a latch member comprising a rod slidably mounted in a bore in said housing, said rod having an end extending beyond said housing and engaging the end of said spring-charged trigger to hold the nozzle valve open and a pin connected to said rod in the rotary path of said shoulder and engageable by said shoulder to move said rod inwardly into said housing to release the end of said trigger to permit spring closing of said nozzle valve at a given time.

2. A metering device for connection between a fluid control nozzle having a valve operable to open position by a spring-charged trigger and a supply conduit to said nozzle, said device comprising a housing mounted between said supply conduit and the back of said nozzle, said housing having a tubular member formed integral therewith and extending transversely of said housing and having one end connected to said supply conduit and the other to said nozzle, said tubular member having a chamber therein, a longitudinal shaft mounted in said chamber, a rotor fastened to said shaft, a worm gear fastened to said shaft, a second shaft transversely mounted in said housing, a worm wheel fastened to said second shaft in driving engagement with said worm, a stub shaft in said housing, a worm drive between said second shaft and said stub shaft, a face gear fastened to said stub shaft, an arm rotatably mounted on said stub shaft alongside of said face gear, said arm having an offset shoulder yieldingly engaging a desired tooth of said face gear, a latch member comprising a rod slidably mounted in a bore in said housing, said rod having an end extending beyond said housing and engaging the end of said spring-charged trigger to hold the nozzle valve open and a pin connected to said rod in the rotary path of said shoulder and engageable by said shoulder to move said rod inwardly into said housing to release the end of said trigger to permit spring closing of said nozzle valve at a given time, and a thumb member connected to the side of said rod and extending outside of said housing for manual operation of said latch member.

References Cited in the file of this patent

UNITED STATES PATENTS

| | | |
|---|---|---|
| 1,938,621 | Cornell | Dec. 12, 1933 |
| 2,224,540 | Fraser | Dec. 10, 1940 |
| 2,557,336 | Buchanan | June 19, 1951 |